UNITED STATES PATENT OFFICE.

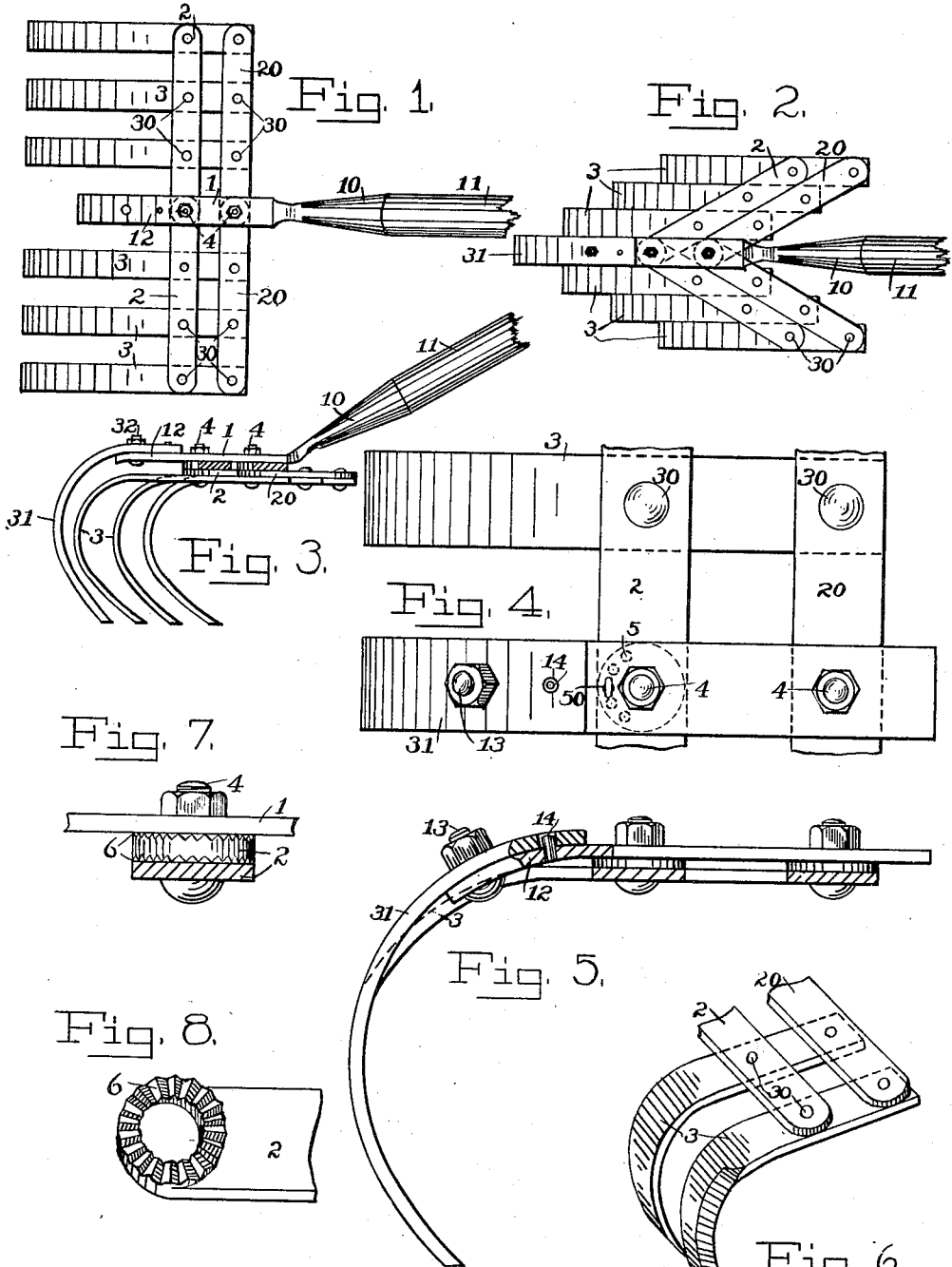

JOHN B. SOWARD, OF SEATTLE, WASHINGTON.

HAND-CULTIVATOR.

1,091,712.

Specification of Letters Patent. Patented Mar. 31, 1914.

Application filed April 17, 1913. Serial No. 761,858.

*To all whom it may concern:*

Be it known that I, JOHN B. SOWARD, a citizen of the United States, and resident of the city of Seattle, county of King, and State of Washington, have invented certain new and useful Improvements in Hand-Cultivators, of which the following is a specification.

My invention relates to hand operated gardening or cultivating tools and consists of an adjustable hand cultivator.

My invention comprises the novel parts and combinations of parts which will be hereinafter described and particularly pointed out in the claims.

The object of my invention is to produce a tool, for hand use, which shall have a number of cultivating or soil stirring teeth and to support these teeth in such manner that they may be disposed so as to form a row or rows, which may be placed in several angular positions relative to the axis of the tool, said axis being considered as the vertical central plane which includes the handle.

Other objects of my invention may be determined from an inspection and study of the drawings and specification of the same.

In the accompanying drawings I have shown my invention in the form which is at present preferred by me.

Figure 1 is a plan view of my tool, the teeth-carrying arms being disposed in a direction which is at right angles with the axis of the tool. Fig. 2 is a plan view with the teeth-carrying arms disposed at a small angle with said axial plane, said arms extending backward under and toward the handle, the same showing one extreme adjustment thereof. Fig. 3 is a sectional elevation taken on a plane lying between the central tooth and the one next to it, said plane of section being forward of the handle. Fig. 4 shows, in plan, a detail of the means employed to adjust and secure the teeth-carrying arms upon the central bar with which the handle is attached. Fig. 5 shows the same features in elevation. Fig. 6 shows, in perspective, the two outer teeth on one side and a section of the parallel frame bars, illustrating the sharpening of the outer tooth to serve for cutting roots, etc. Figs. 7 and 8 are respectively elevation and face view of an alternate pivot securing construction.

The central member which supports the mechanism of my device, is the central bar 1 which, at one end is extended to form a shank and handle receiving socket 10, or in any other suitable manner is constructed to receive and be secured to the handle 11. Secured to this central bar are four laterally extending, teeth-carrying bars 2 and 20, these being mounted thereon by pivot bolts 4 which may be loosened as necessary to adjust the angular position of the teeth-carrying bars. In Fig. 1 I have shown these bars as extending at right angles to the central bar 1 and the axis of the tool, while in Fig. 2 I have shown these as making an angle of thirty degrees with the axis of the tool. This illustrates the limit of adjustment in one direction and the middle point in adjustment, the bars being capable of being adjusted in the opposite direction to an angle of thirty degrees with the central bar 1. The limiting angles of adjustment will vary with the proportions and design, being possibly different from those stated with other proportions of parts.

The teeth-carrying bars are arranged in pairs, each pair consisting of similar bars 2 and 20, one pivoted on the central bar 1, ahead of the other. These bars are connected by the cultivating teeth 3, and pivots 30, each tooth being pivoted to each bar of a pair, whereby the bars 2 and 20, as well as the teeth 3, will remain parallel, each with its companion member, at all angles of adjustment.

The adjustment and holding of the arms 2 and 20 in their different positions, may be secured by various means. One means, and that one which I have herein shown as my preferred form, consists in providing the pivot ends of one or both of the bars 2 and 20, with holes 5 grouped in an arc which is concentric of the pivot bolts 4, the holes 5 being located, preferably, on one side of the center line of the bar and extending through an arc corresponding with the maximum arc of adjustment.

The bars 2 and 20, if both are provided with holding mechanisms, lying at both sides of the central bar 1, are provided with similar and similarly located holes 5, except that they lie at opposite sides of the center lines of the bars for opposite bars. The bars themselves may be exactly alike and the above named difference be secured by reversing the bars.

The central bar 1 is provided with one or more holes, located so as to register with the holes in the bars 2, and a pin 50 is provided which will pass through both bars 2 and the central bar 1, thereby locking them all together. While this locking pin 50 may be loose, I prefer that it be permanently secured to one of these bars and enter the holes in the others. This may be most conveniently done by securing it to the central bar 1, as this enables both bars 2, and 20, if both are to be locked, to be made as duplicates.

The central bar 1 has an extension 12, from its end which is opposite that to which the handle is secured. To this extension is removably attached a central tooth 31, which tooth is essentially the same as the teeth 3, except as it differs to fit it for attachment and removal from the extension 12.

A securing bolt 13 passes through holes in both the extension 12 and the tooth 31, and a pin 14 carried by one of these parts enters a hole in the other, thereby preventing possible turning of the tooth. There are numerous other ways by which this tooth may be secured so that it may be removed readily and at will. I have shown and described the above mechanism only as an illustration of one method which may be employed and that which I now prefer to use.

In Fig. 1 I have shown my device with this central tooth removed. In this condition it is adapted for working simultaneously upon both sides of a row of plants, the plants occupying the space between the side sets of teeth. When the central tooth is in place, there is no uncultivated strip left between the space tilled by the side sets.

To prevent conflict with the arms 2 when the latter are swung back to the limit of their swing in that direction, I prefer that the central tooth 31 be secured to the upper side of the extension 12, as is shown in Fig. 5.

In Figs. 7 and 8 an alternate construction for securing these teeth-carrying bars is shown. This consists in providing their pivot ends with ratchet teeth, 6, which may be engaged and held together by the pivot bolt. Other means for securing these pivots may be employed.

I prefer that the outer tooth at each side of the tool, be sharpened upon its outer edge, as shown at 7 in Fig. 6, so that said tooth may be used with which to cut roots, weeds, etc., when desired.

This tool is light but strong, and may be used in ground which is quite firm, leaving the same with a finely pulverized surface. It may be conveniently adjusted for different angles of the teeth-carrying bars and overall widths. In all adjustments the teeth maintain parallelism of position. When adjusted to its minimum width, the cutting ends of the teeth will entirely cover the surface, there being no vacant space left between consecutive teeth. This is insured by proportioning the width of teeth, the width of the teeth-carrying arms and the spacing of their pivots, so that the edges of the teeth are brought into contact when the arms 2 and 20 are brought together.

The central tooth is made of the same width as the central bar 1, thereby covering the space which would be left between the innermost teeth of those carried by the bars 2 and 20. This central tooth is easily removed, thus giving a tool which may be used to till along both sides of a row of small plants.

When the teeth-carrying arms are adjusted back under the handle, the tendency will be to throw the dirt slightly toward the center, while when adjusted oppositely, there is a slight tendency to throw the dirt the other way.

What I claim as my invention and desire to patent is:

A cultivating tool comprising a central bar having means for securing an operating handle thereto, and for securing two pivot bolts at points separated lengthwise the same, two pairs of teeth-carrying bars pivoted in pairs upon said bolts, adjusting and securing means for said bars comprising holes in the bars disposed about their pivot bolts and a pin secured to the central bar and entering said holes in the teeth-carrying bars, teeth, each pivoted to both bars of one pair, the central bar having an extension beyond the pivot bolts, and a central tooth removably secured to said extension.

In testimony whereof I have hereunto affixed my signature this 10th day of April, 1913.

JOHN B. SOWARD.

Witnesses:
BERTHA S. SOWARD,
Mrs. HENRY BUTTS.